United States Patent
Agrawal et al.

(10) Patent No.: US 12,238,630 B2
(45) Date of Patent: Feb. 25, 2025

(54) WIRELESS COMMUNICATION USING MULTIPLE FREQUENCIES SEGMENTS

(71) Applicant: MAXLINEAR, INC., Carlsbad, CA (US)

(72) Inventors: Abhishek Kumar Agrawal, Fremont, CA (US); Huizhao Wang, San Jose, CA (US); Peiman Amini, Fremont, CA (US); Sigurd Schelstraete, Menlo Park, CA (US); Debashis Dash, Newark, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 65 days.

(21) Appl. No.: 17/237,421

(22) Filed: Apr. 22, 2021

(65) Prior Publication Data
US 2021/0344465 A1    Nov. 4, 2021

Related U.S. Application Data

(60) Provisional application No. 63/019,220, filed on May 1, 2020.

(51) Int. Cl.
*H04W 40/12*    (2009.01)
*H04B 7/0452*   (2017.01)
*H04L 1/00*     (2006.01)
*H04L 1/18*     (2023.01)
*H04L 5/00*     (2006.01)
(Continued)

(52) U.S. Cl.
CPC .......... *H04W 40/12* (2013.01); *H04B 7/0452* (2013.01); *H04L 1/0061* (2013.01); *H04L 1/18* (2013.01); *H04L 5/0005* (2013.01); *H04L 5/0041* (2013.01); *H04L 5/0044* (2013.01); *H04L 5/0053* (2013.01); *H04L 47/34* (2013.01); *H04W 28/06* (2013.01); *H04W 72/542* (2023.01); *H04W 74/0816* (2013.01);
(Continued)

(58) Field of Classification Search
None
See application file for complete search history.

(56) References Cited

U.S. PATENT DOCUMENTS 6,301,249 B1    10/2001  Mansfield et al.
10,547,656 B2 *  1/2020  Frusina ................. H04L 65/611
(Continued)

OTHER PUBLICATIONS

Edward Au, IEEE 802.11be: Extremely High Throughput, IEEE Vehicular Technology Magazine | Sep. 2019.
(Continued)

*Primary Examiner* — Jeffrey M Rutkowski
*Assistant Examiner* — Mehedi S Aley
(74) *Attorney, Agent, or Firm* — Buchalter; Jason W. Croft (57) ABSTRACT

An example method of wireless data transmission may include selecting a first frequency segment and selecting a second frequency segment that is different from and non-contiguous with the first frequency segment. The method may further include encoding a first signal with a data frame using the first frequency segment and encoding a second signal with the data frame using the second frequency segment. The method may further include providing the first signal and the second signal for wireless transmission such that at least a portion of the first signal and a portion of the second signal are simultaneously wirelessly transmitted.

20 Claims, 7 Drawing Sheets

(51) Int. Cl.
*H04L 47/34* (2022.01)
*H04W 28/06* (2009.01)
*H04W 72/542* (2023.01)
*H04W 74/0816* (2024.01)
*H04W 88/08* (2009.01)
*H04W 72/044* (2023.01)
*H04W 72/0453* (2023.01)

(52) U.S. Cl.
CPC ...... *H04W 88/085* (2013.01); *H04W 72/0453* (2013.01); *H04W 72/0473* (2013.01)

(56) References Cited

U.S. PATENT DOCUMENTS

| | | |
|---|---|---|
| 11,018,917 B1 | 5/2021 | Shattil |
| 11,184,037 B1 | 11/2021 | Shattil |
| 11,317,387 B2 | 4/2022 | Li et al. |
| 11,368,896 B2 | 6/2022 | Agrawal et al. |
| 11,387,973 B2 | 7/2022 | Kim et al. |
| 11,647,444 B2 | 5/2023 | Agrawal et al. |
| 11,758,461 B2 | 9/2023 | Agrawal et al. |
| 2006/0018295 A1 | 1/2006 | Choi et al. |
| 2009/0175210 A1* | 7/2009 | Vijayan ............... H04L 1/0065 370/312 |
| 2009/0296591 A1 | 12/2009 | Urabe et al. |
| 2011/0222408 A1 | 9/2011 | Kasslin et al. |
| 2011/0286403 A1 | 11/2011 | Jain et al. |
| 2012/0117446 A1 | 5/2012 | Taghavi Nasrabadi et al. |
| 2013/0100922 A1* | 4/2013 | Ahn ................. H04W 72/0446 370/329 |
| 2013/0223345 A1 | 8/2013 | Asterjadhi et al. |
| 2013/0295980 A1 | 11/2013 | Reuven et al. |
| 2013/0301750 A1* | 11/2013 | Chang ............... H04L 25/4923 375/286 |
| 2014/0003378 A1* | 1/2014 | Sipola ............... H04W 28/065 370/329 |
| 2014/0094111 A1* | 4/2014 | Ravindran ............. H04H 60/46 455/3.06 |
| 2014/0140451 A1 | 5/2014 | Callard et al. |
| 2014/0269540 A1 | 9/2014 | Wang |
| 2016/0202344 A1 | 7/2016 | Sanderovich et al. |
| 2016/0234792 A1 | 8/2016 | Zhuang et al. |
| 2017/0070267 A1 | 3/2017 | Nabetani et al. |
| 2017/0251488 A1 | 8/2017 | Urban et al. |
| 2017/0310601 A1 | 10/2017 | Yu et al. |
| 2018/0084554 A1 | 3/2018 | Chu et al. |
| 2018/0337866 A1 | 11/2018 | Jung et al. |
| 2019/0082394 A1 | 3/2019 | Abdelmonem et al. |
| 2019/0089515 A1 | 3/2019 | Madhavan et al. |
| 2019/0104011 A1 | 4/2019 | Yang et al. |
| 2019/0253296 A1 | 8/2019 | Chen et al. |
| 2019/0268099 A1 | 8/2019 | Chu et al. |
| 2020/0014495 A1 | 1/2020 | Niu et al. |
| 2020/0037324 A1* | 1/2020 | Chu ....................... H04L 1/0057 |
| 2020/0091971 A1 | 3/2020 | Dehghan et al. |
| 2020/0107393 A1* | 4/2020 | Chu ....................... H04L 1/0003 |
| 2020/0111351 A1 | 4/2020 | Vadlamani et al. |
| 2020/0136753 A1 | 4/2020 | Zhang et al. |
| 2020/0145072 A1 | 5/2020 | Dash et al. |
| 2020/0169323 A1 | 5/2020 | Moro |
| 2020/0187129 A1 | 6/2020 | Sanderovich et al. |
| 2020/0229214 A1* | 7/2020 | Zhang ................... H04L 1/1861 |
| 2020/0275432 A1 | 8/2020 | Li et al. |
| 2020/0280877 A1 | 9/2020 | Morioka et al. |
| 2020/0336254 A1 | 10/2020 | Chu et al. |
| 2020/0336993 A1 | 10/2020 | Wang et al. |
| 2020/0344007 A1 | 10/2020 | Chen et al. |
| 2020/0359113 A1 | 11/2020 | Dahm et al. |
| 2021/0014894 A1* | 1/2021 | Li ....................... H04W 72/1273 |
| 2021/0105055 A1* | 4/2021 | Chae ..................... H04L 5/0091 |
| 2021/0136102 A1 | 5/2021 | Bendiabdallah et al. |
| 2021/0136700 A1 | 5/2021 | Arad et al. |
| 2021/0282077 A1 | 9/2021 | Wei et al. |
| 2021/0288768 A1* | 9/2021 | Yang ..................... H04L 5/0044 |
| 2021/0297121 A1 | 9/2021 | Hao et al. |
| 2021/0306426 A1 | 9/2021 | Juntunen et al. |
| 2021/0344472 A1 | 11/2021 | Agrawal et al. |
| 2021/0345169 A1 | 11/2021 | Wang et al. |
| 2021/0391949 A1 | 12/2021 | Sugaya |
| 2021/0410183 A1 | 12/2021 | Fodor et al. |
| 2022/0038159 A1* | 2/2022 | Hao ..................... H04B 7/0639 |
| 2022/0116991 A1 | 4/2022 | Wilhelmsson et al. |
| 2022/0377603 A1* | 11/2022 | Kim ....................... H04L 1/08 |
| 2022/0416861 A1* | 12/2022 | Manolakos ........... H04L 1/0029 |
| 2023/0239764 A1 | 7/2023 | Agrawal et al. |

OTHER PUBLICATIONS

Adame et al. "Time-Sensitive Networking in IEEE 802.11be: On the Way to Low-latency WiFi 7" Dec. 12, 2019.
Havey D., et al., "Fast Wireless Protocol: A Network Stack Design for Wireless Transmission," IFIP Networking Conference, Brooklyn, NY, USA, 2013, 9 Pages.
Final Office Action for U.S. Appl. No. 17/237,383, dated Jan. 24, 2024, 26 pages.
Final Office Action for U.S. Appl. No. 17/237,510, dated Sep. 1, 2023, 22 pages.
Non-Final Office Action for U.S. Appl. No. 18/194,404, dated Feb. 15, 2024, 9 pages.
Final Office Action for U.S. Appl. No. 18/194,404, dated Aug. 14, 2024, 14 Pages.
Final Office Action for U.S. Appl. No. 17/237,510, dated May 7, 2024, 23 Pages.
Non-Final Office Action for U.S. Appl. No. 17/237,383, dated Jun. 26, 2024, 28 pages.

* cited by examiner

FIG. 7

WIRELESS COMMUNICATION USING MULTIPLE FREQUENCIES SEGMENTS

CROSS-REFERENCE TO RELATED APPLICATION

This patent application claims priority to U.S. Provisional Patent Application No. 63/019,220, filed on May 1, 2020, which is incorporated herein by reference in its entirety.

FIELD

The implementations discussed herein are related to wireless communication using multiple frequencies segments.

BACKGROUND

Unless otherwise indicated in the present disclosure, the materials described in the present disclosure are not prior art to the claims in the present application and are not admitted to be prior art by inclusion in this section.

Wireless communications may occur by transmitting data over frequencies designated for wireless transmission. For example, a transmitting device may send data over a first contiguous range of frequencies, such as frequencies associated with a channel within a wireless frequency band of the frequency spectrum. The receiving device may obtain the data using the first contiguous range of frequencies. In response to the data not being correctly received, the transmitting device may resend the data again over the first contiguous range of frequencies.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

An example method of wireless data transmission may include selecting a first frequency segment and selecting a second frequency segment that is different from and non-contiguous with the first frequency segment. The method may further include encoding a first signal with a data frame using the first frequency segment and encoding a second signal with the data frame using the second frequency segment. The method may further include providing the first signal and the second signal for wireless transmission such that at least a portion of the first signal and a portion of the second signal are simultaneously wirelessly transmitted.

BRIEF DESCRIPTION OF THE DRAWINGS

Example implementations will be described and explained with additional specificity and detail through the use of the accompanying drawings in which.

DETAILED DESCRIPTION OF SOME EXAMPLE IMPLEMENTATIONS

Implementations described herein may generally relate to wireless communication.

In some implementations, wireless communication as described in this disclosure may include redundant data frames that are simultaneously wirelessly transmitted between first and second devices. For example, a first signal may be encoded with a data frame using a first frequency segment of a frequency spectrum, such as a first resource unit of the frequency spectrum. A second signal may be encoded with the same data frame using a second frequency segment of the frequency spectrum, such as a second resource unit of the frequency spectrum. The first frequency segment may be different from and non-contiguous with the second frequency segment. For example, the first frequency segment and the second frequency segment may be parts of different channels of a frequency band. Alternately or additionally, the first frequency segment and the second frequency segment may be parts of different frequency bands. In these and other implementations, the first signal and the second signal may be simultaneously wirelessly transmitted from the first device to the second device. As such, the data frame may be transmitted over multiple different data streams with frequency diversity.

The second device may receive both the first signal and the second signal encoded with the same data frame. The second device may decode the first signal to obtain a first copy of the data frame and the second signal may decode the second signal to obtain a second copy of the data frame. The second device may further determine an integrity of the first copy and the second copy of the data frame. The copy of the data frame with maintained integrity may be used as a received data frame by the second device. If an integrity of both copies of the data frame is maintained, the second device may select one of the copies of the data frame to discarded and the other may be used as the received data frame.

Encoding the first signal and the second signal with the same data frame may help to ensure that the second device receives the data frame. For example, if there is interference in the first frequency segment, the first signal may not be received by the second device with an integrity sufficient to properly decode the first signal to obtain the data frame. Without transmission of the second signal with the data frame, the second device may request that the first device retransmit the data frame. However, requesting a retransmission of the data frame delays reception of the data frame, which may be disadvantageous with respect to certain communications, such as a low-latency communications, among other communications. Providing the data frame simultaneously across multiple different links may help to reduce retransmission of data frames and improve wireless communication between devices.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

Figure 1:
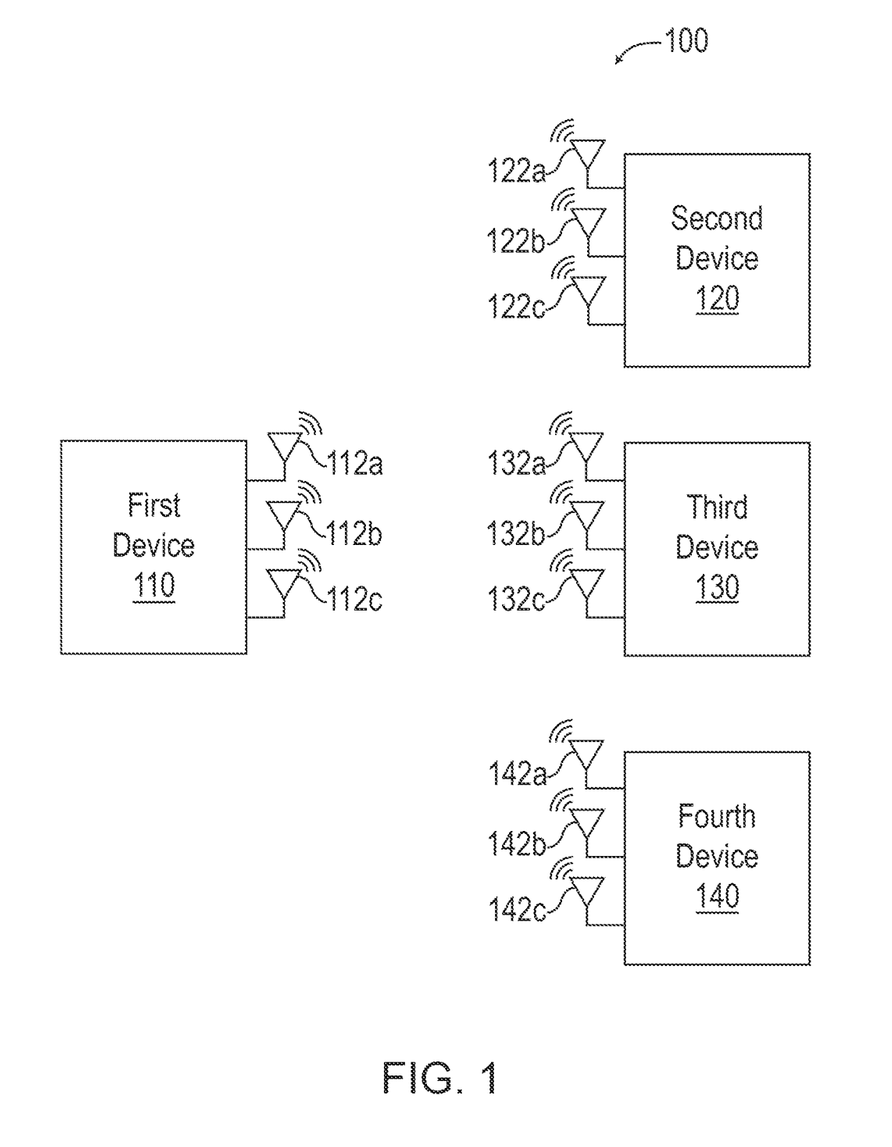
FIG. 1 illustrates an example environment that includes wireless communication.

FIG. 1 illustrates an example environment 100 that includes wireless data transmission, in accordance with one or more implementations of the present disclosure. The environment 100 may include a first device 110, a second device 120, a third device 130, and a fourth device 140. The first device 110 may include first, second, and third antennas 112a-112c, "the antennas 112." The second device 120 may include first, second, and third antennas 122a-122c, "the antennas 122." The third device 130 may include first, second, and third antennas 132a-132c, "the antennas 132." The fourth device 140 may include first, second, and third antennas 142a-142c, "the antennas 142."

Each of the first device 110, the second device 120, the third device 130, and the fourth device 140 may be configured to transmit and receive wireless communications. In some implementations, each of the first device 110, the second device 120, the third device 130, and the fourth device 140 may be any electronic or digital device that is configured to transmit and receive wireless communications. In these and other implementations, the first device 110 may be configured as a device that may assist in maintaining a wireless local area network. For example, the first device 110 may include a gateway, a repeater, a mesh node, or any other suitable device configured to host or control access to a wireless local area network (WLAN).

In these and other implementations, each of the second device 120, the third device 130, and the fourth device 140 may be configured as a repeater, a mesh node, or any other suitable device configured to host or control access to a wireless local area network. Alternately or additionally, each of the second device 120, the third device 130, and the fourth device 140 may be configured as a client device that may be configured to access a wireless local area network. For example, each of the second device 120, the third device 130, and the fourth device 140 may include a desktop computer, a laptop computer, a smartphone, a mobile phone, a tablet computer, a vehicle, a repeater, a speaker, a smart device, an appliance, or any other electronic device that may be configured to transmit and/or receive wireless communications in a wireless local area network.

The antennas 112, antennas 122, the antennas 132, and the antennas 142 may each be configured to operate in a first frequency band, a second frequency band, and/or a third frequency band, referred to as the frequency bands. The first, second, and third frequency bands may each be different frequency bands of operations and may each be used for a different wireless local area network (WLAN). For example, the first antenna 112a may be configured to operate in the 5.0 GHz frequency band and support a first WLAN. The second antenna 112b may be configured to operate in the 6.0 GHz frequency band and support a second WLAN. The third antenna 112c may be configured to operate in the 2.4 GHz frequency band and support a third WLAN. Alternately or additionally, each of the antennas 112, 122, 132, and 142 may be configured to operate in the same frequency band and support the same WLAN. Alternately or additionally, the antennas 112, 122, 132, and 142 may be configured to operate in any configuration of frequency bands. In some implementations, each of the antennas 112, 122, 132, and 142 may be configured to operate in a different frequency band of operation during overlapping time periods, such as simultaneously. For example, the first antenna 112a and the second antenna 112b may simultaneously transmit and/or receive wireless communications in the first and second frequency bands, respectively.

The first, second, and third WLANs may be implemented using any of the 802.11 protocols or other suitable wireless standards or protocols. In these and other implementations, the first, second, and third frequency bands may be distinct radio frequency ranges that are defined for wireless communications. In some implementations, at least one of the first, second, and third frequency bands may include a discontinuous range of frequencies.

In some implementations, the first device 110 may be configured to transmit data to the second device 120, the third device 130, and the fourth device 140 over one or more communication links. A communication link may be a contiguous frequency segment of one of the frequency bands. For example, a communication link may include one or more contiguous channels of the 5 GHz frequency band.

In some implementations, the first device 110 may be configured to select a communication technique for transmission of data to the second device 120, the third device 130, and/or the fourth device 140. In these and other implementations, the communication technique may be selected based on a type of service indication of the data and/or network factors of the one or more WLANs associated with the first device 110. For example, a type of service indication of the data may indicate latency requirements, reliability requirements, and throughput requirements, among other requirements. For example, data from a low latency program such as a video conferencing may use a first communication technique and data where latency is not a concern may use a second communication technique.

A first communication technique may include using an existing link between the first device 110 and receiving device. A second communication technique may include selecting a link from multiple links in one or more of the frequency bands, e.g., the first frequency band, the second frequency band, and/or the third frequency band, with an appropriate stability and throughput for the type of service indicated for the data. To select between links, the first device 110 may be configured to obtain link state information. The link state information may be based on analysis of data frames previously exchanged and information collected from the second device 120, the third device 130, and/or the fourth device 140. The information collected may include channel quality indicator (CQI) information. In some implementations, the CQI information may be provided to the first device 110 outside of normal times when CQI information is collected. For example, additional CQI information outside of what normally is provided in a wireless protocol may be provided by inserting the additional CQI information in a larger frame. In these and other implementations, the CQI information may include information such as a duty cycle of the interference information.

Using the link state information, the first device 110 may determine a success rate and/or a maximum data rate for the multiple links. Based on the success rate and/or the maximum data rate, the first device 110 may select a link that is appropriate for the type of service indicated for the data.

A third communication technique may include frame coding that includes coding a first data frame and a second data frame together to generate a third data frame. The third data frame may be transmitted to a receiving device over a frequency segment. The receiving device may decode the third data frame to obtain both the first data frame and the second data frame. As such, either one of the first data frame or the second data frame may be recovered when one of the first data frame or the second data frame is not successively received. Thus, transmission of one data frame may result in the reception of multiple data frames at the receiving device.

The receiving device may maintain or discard one or both of the decoded multiple data frames based on the reception of other data frames. In these and other implementations, the coding and decoding of the data frame may occur in the data link layer such that a network layer or other higher networking layer may not be aware of the coding and decoding of the data frame.

A fourth communication technique may include duplication of a data frame. For example, a data frame may be simultaneously transmitted over multiple links from the first device 110 to a receiving device. For example, the data frame may be simultaneously transmitted over a first link and over a second link from the first device 110 to a receiving device. In these and other implementations, the data frame may be encoded into a first signal using a first frequency segment of a frequency spectrum and the data frame may be encoded into a second signal using a second frequency segment of the frequency spectrum.

In some implementations, the first device 110 may transmit the first signal and the second signal to the receiving device such that at least a portion of the first signal and a portion of the second are simultaneously transmitted. For example, the transmission of the first signal and the second signal may be offset by one or more symbols, but at least one symbol of each of the first signal and the second signal may be transmitted simultaneously by the first device 110. Alternately or additionally, the first signal and the second signal may be transmitted in non-overlapping time periods.

Figure 2A:
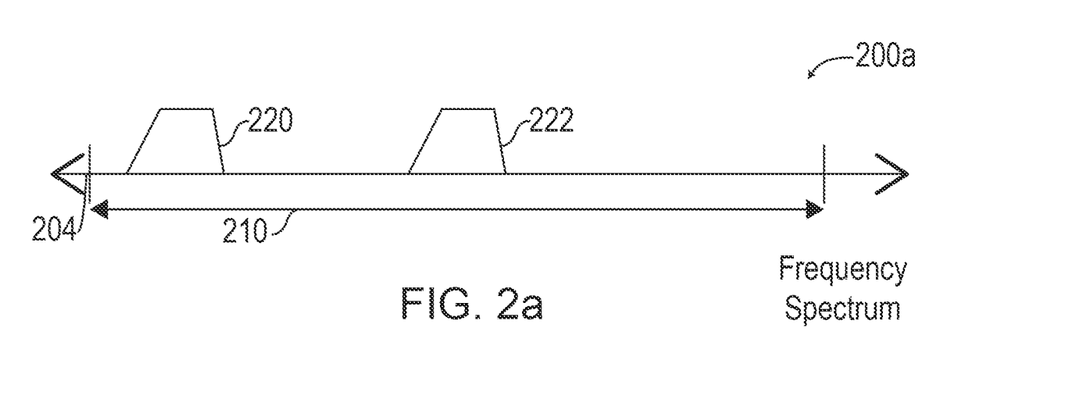
FIGS. 2A-2C illustrates example frequency spectrums.

FIG. 2A illustrates a first frequency spectrum 200a with a first frequency segment 220 and a second frequency segment 222 as discussed above, in accordance with one or more implementations of the present disclosure. The first frequency segment 220 may carry a first signal encoded with a data frame and the second frequency segment 222 may carry the second signal encoded with the same data frame. As illustrated in FIG. 2A, the first frequency segment 220 and the second frequency segment 222 may include frequency segments of a first frequency band 210 but may be non-contiguous frequency segments of the first frequency band 210. In some implementations, the first frequency segment 220 and/or the second frequency segment 222 may cover a portion of a channel or may cover multiple channels of the first frequency band 210. In these and other implementations, one or more signals for one or more other devices may by simultaneously transmitted using the frequency spectrum between the first frequency segment 220 and the second frequency segment 222 within the first frequency band 210.

In some implementations, a size of the first frequency segment 220 and the second frequency segment 222 may be selected based on a data frame size for the data to be transmitted and/or a number of interferes, such as a number of wireless devices in an environment receiving of a transmitting device, such as the first device 110 of FIG. 1.

Figure 2B:
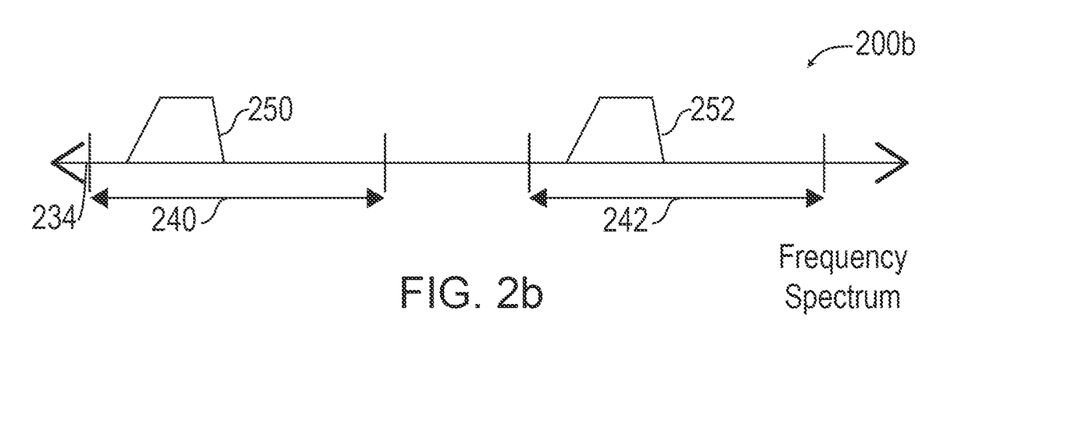

FIG. 2B illustrates a second frequency spectrum 200b with the first frequency segment 220 and the second frequency segment 222, in accordance with one or more implementations of the present disclosure. As illustrated in the second frequency spectrum 200b, the first frequency segment 220 may be within the first frequency band 210 and the second frequency segment 222 may be within a second frequency band 230. In these and other implementations, the first frequency band 210 may be used by a first WLAN for operation and the second frequency band 230 may be used by a second WLAN for operation that is separate and distinct from the first WLAN.

Figure 2C:
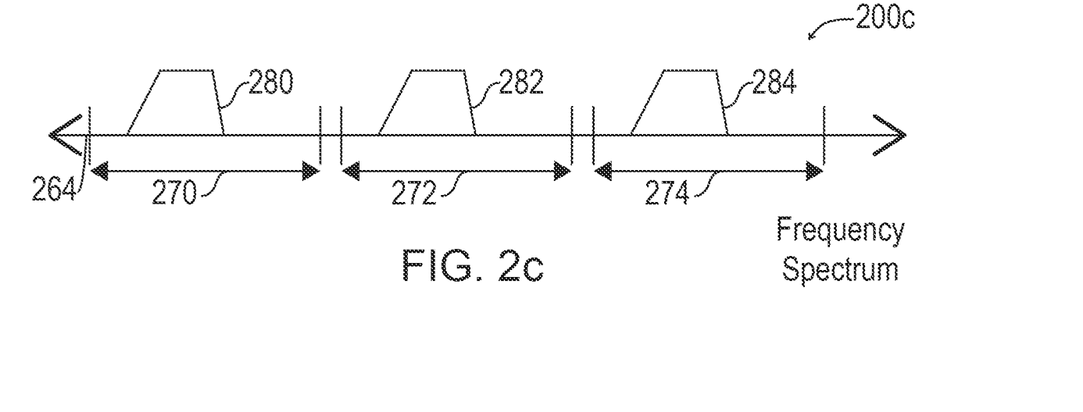

FIG. 2C illustrates a third frequency spectrum 200c with the first frequency segment 220, the second frequency segment 222, and a third frequency segment 224, in accordance with one or more implementations of the present disclosure. The third frequency segment 224 may carry a third signal encoded with the same data frame as that carried by the first signal and the second signal. As illustrated in the third frequency spectrum 200c, the first frequency segment 220 may be within the first frequency band 210, the second frequency segment 222 may be within the second frequency band 230, and the third frequency segment 224 may be within a third frequency band 240. In these and other implementations, the third frequency band 240 may be used by a third WLAN for operation that is separate and distinct from the first WLAN and the second WLAN.

Modifications, additions, or omissions may be made to the frequency spectrum 200a-200c without departing from the scope of the present disclosure. For example, in some implementations, the first frequency segment 220 and the second frequency segment 222 in the first frequency band 210 may be adjacent frequency segments. Alternately or additionally, more than three frequency segments may be used in any configuration of frequency bands to carry signals encoded with the same data frame.

Returning to the discussion of FIG. 1, after selection of the communication technique, the first device 110 may be configured to direct the data for transmission to the second device 120, the third device 130, and/or the fourth device 140 using the selected technique.

In some implementations, the communication technique selected may change from data frame to data frame for the data to the transmitted to a receiving device. For example, for a first data frame, the fourth communication technique may be used. For a second data frame, the first communication technique may be used and for a third data frame, the third communication technique may be used. Any combination of communication techniques may be used for series of data frames for transmitting data from the first device 110 to a receiving device. In these and other implementations, the first device 110 may use different techniques for transmitting to different receiving devices. For example, the first device 110 may use the fourth communication technique for transmission to the second device 120 and the third communication technique for transmission to the third device 130. Alternately or additionally, any combination of the techniques may be selected. For example, the second, third, and/or fourth communication techniques may be combined. As an example, the second communication technique may be used to select multiple frequency segments for the fourth communication technique and the data frames sent over the multiple frequency segments may be coded data frames that represent two or more data frames as described in the third communication technique.

A receiving device, such as the second device 120, may obtain the first signal and the second signal transmitted by the first device 110. The second device 120 may be configured to decode the first signal to obtain a first transmitted data frame and to decode the second signal to obtain a second transmitted data frame. The second device 120 may be configured to determine that the first transmitted data frame is the same as the second transmitted data frame. In some implementations, the second device 120 may use information from the preambles and/or frame headers of the first and second transmitted data frames to determine that the first transmitted data frame and the second transmitted data frame are the same. For example, the preambles or frame headers may include a data field that includes information indicating that the first transmitted data frame and the second transmitted data frame are the same. Alternately or additionally, the second device 120 may use characteristics of the first and second transmitted data frames to determine the first and second transmitted data frames are the same. The characteristics to determine the first and second transmitted data frames are the same may include a length, hash value, or sequence number of the first and second transmitted data frames, among other characteristics.

The second device 120 may also be configured to determine an integrity of the first and second transmitted data frames. For example, the integrity of the first and second transmitted data frames may indicate if the transmitted data frames are properly received and the first and second signals properly decoded such that the data of the data frame transmitted is accurately included in the transmitted data frames. In some implementations, the integrity of the first and second transmitted data frames may be considered maintained in response to a checksum or other determination that the first and second transmitted data frames are accurately transmitted, received, and decoded without errors for which there is not compensation. In these and other implementations, the integrity of the first and second transmitted data frames may be considered not maintained in response to a checksum or other determination that the first and second transmitted data frames include errors for which there is not compensation.

Based on the integrity of the first and second transmitted data frames and determining that the first and second transmitted data frames are the same, the second device 120 may determine which of the first and second transmitted data frames to consider as a received data frame and which of the first and second transmitted data frames to discard. A received data frame may be considered as being received by the second device 120 and used in further processing by the second device 120. For example, a received data frame may be provided to a network layer of the first device 110 for further communication to other layers of a network protocol used by the first device 110. In contrast, a discarded data frame may only be known to a physical and datalink layer of the first device 110. No information regarding the discarded data frame may be provided to the network layer of the first device 110.

For example, the second device 120 may determine that the first and second transmitted data frames are not the same. In these and other implementations, the second device 120 may discard transmitted data frames with unmaintained integrity and indicate transmitted data frames with maintained integrity as received data frames. If one of the first and second transmitted data frames is discarded a request may be made by the second device 120 to the first device 110 for retransmission of the discarded transmitted data frame.

As another example, the second device 120 may determine that the first and second transmitted data frames are the same. In these and other implementations, in response to both the first and second transmitted data frames not having maintained integrity, the second device 120 may discard both the first and second transmitted data frames and may request the first device 110 to retransmit the transmitted data frame. In response to one of the first and second transmitted data frames having maintained integrity, the one of the first and second transmitted data frames may be considered as a received data frame, the other of the first and second transmitted data frames may be discarded, and no request for retransmission may be made by the second device 120 to the first device 110. In response to both of the first and second transmitted data frames having maintained integrity, one of the first and second transmitted data frames may be considered as a received data frame, the other of the first and second transmitted data frames may be discarded, and no request for retransmission may be made by the second device 120 to the first device 110. Thus, as described a transmitted data frame that is properly transmitted with maintained integrity may be discarded because the transmitted data frame may be a duplicate frame that may not be used by the second device 120 in further processing.

Modifications, additions, or omissions may be made to the environment 100 without departing from the scope of the present disclosure. For example, the environment 100 may include any number of other elements or may be implemented within other systems or contexts than those described. For example, the first device 110, the second device 120, the third device 130, and/or the fourth device 140 may include addition antenna. As another example, the environment 100 may include fewer or more devices than the device illustrated.

Figure 3:
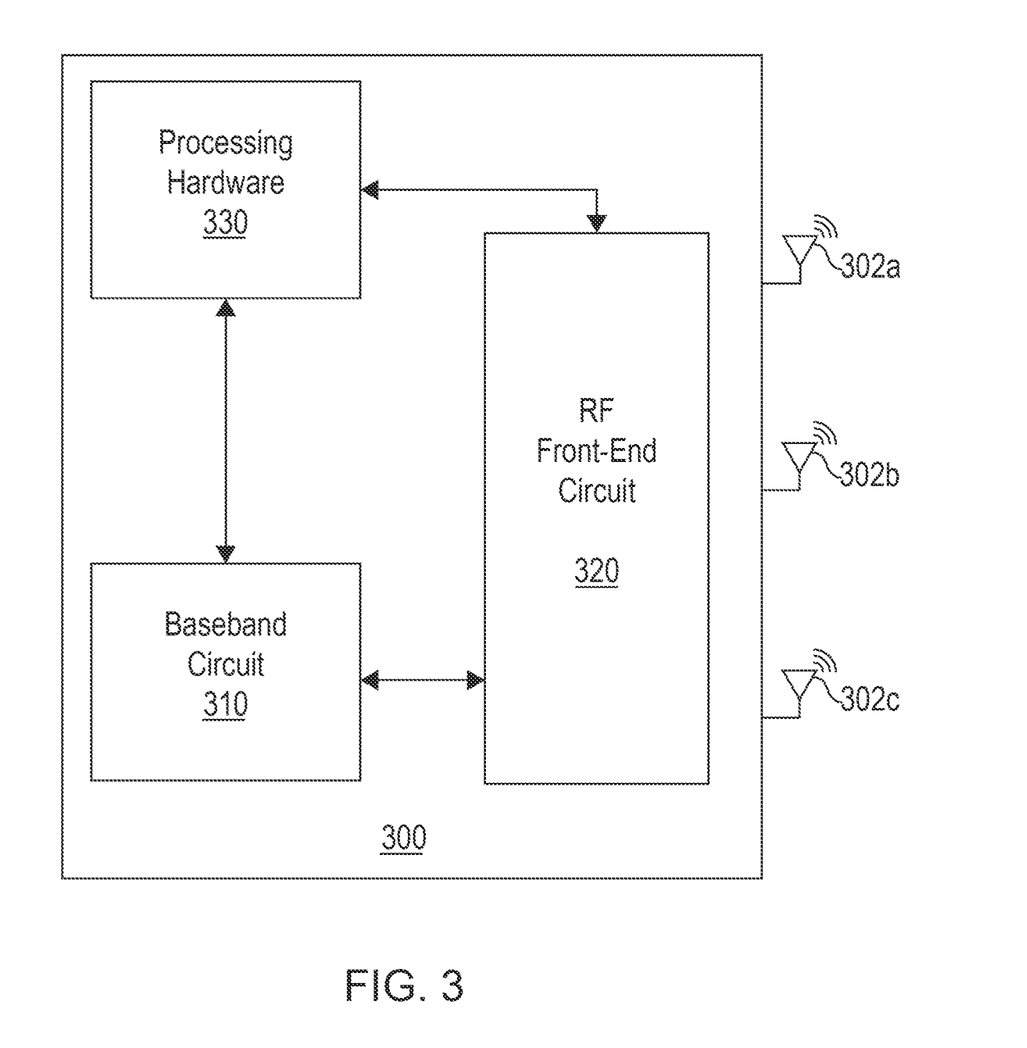
FIG. 3 illustrates an example device configured for wireless data transmission.

FIG. 3 illustrates an example device 300 configured for wireless data transmission, in accordance with one or more implementations of the present disclosure. The device 300 may be an example implementation of one of the devices of FIG. 1.

The device 300 may include first, second, and third antenna elements 302*a*-302*c*, referred to collectively as the antenna elements 302, a baseband circuit 310, a RF front-end circuit 320, and processing hardware 330.

In some implementations, the baseband circuit 310 may be configured to encode transmit signals with data frames using a baseband frequency. The baseband circuit 310 may provide the transmit signals to the RF front-end circuit 320. The baseband circuit 310 may also be configured to obtain receive signals at a baseband frequency from the RF front-end circuit 320 and to decode the obtained receive signals to obtain data frames. In some implementations, the baseband circuit 310 may provide the obtained data frames to the processing hardware 330 for further processing.

In some implementations, the baseband circuit 310 may be configured to encode signals with data frames based on a communication technique selected by the processing hardware 330. For example, the processing hardware 330 may direct the baseband circuit 310 to generate two or more baseband transmit signals from a single transmit data frame. The baseband circuit 310 may provide the two or more baseband transmit signals to the RF front-end circuit 320.

In some implementations, the RF front-end circuit 320 may be configured to obtain baseband transmit signals from the baseband circuit 310. The RF front-end circuit 320 may include a conversion circuit configured to shift the baseband transmit signals to different frequency segments as directed by the processing hardware 330. For example, the RF front-end circuit 320 may shift a first baseband transmit signal to a first frequency segment of a first frequency band for transmission by the first antenna element 302*a*, shift a second baseband transmit signal to a second frequency segment of a second frequency band for transmission by the second antenna element 302*b*, and shift a third baseband transmit signal to a third frequency segment of a third frequency band for transmission by the third antenna element 302*c*.

The RF front-end circuit 320 may further be configured to obtain receive signals from the antenna elements 302. The conversion circuit of the RF front-end circuit 320 may be configured to shift the receive signals to the baseband frequency and provided the receive signals at the baseband frequency to the baseband circuit 310. The RF front-end circuit 320 may further include additional circuitry that may be configured to further condition transmit and receive signals for the supported frequency bands, such as filters, amplifiers, and other circuitry.

In some implementations, the processing hardware 330 may be configured to provide data frames to the baseband circuit 310 for transmission. The processing hardware 330 may be further configured to select a communication technique for the data frames.

In some implementations, the processing hardware 330 may be configured to receive a type of service for a data frame. The type of service may indicate a latency level and/or reliability level requested for the data frame. The processing hardware 330 may also be configured to receive one or more network factors regarding the WLAN hosted by the device 300. The network factors may include frequency band data, such as potential data rates of frequency bands supported by the device 300, ranges of the frequency bands supported the device 300, and power requirements of the frequency band supported the device 300; environment data such as interferes in the environment and other wireless networks in the environment that includes the device 300; and device data such as frequency bands of operation of the device 300, among other types of data.

In these and other implementations, the processing hardware 330 may be configured to select a communication technique for the data frames provided to the baseband circuit 310 based on the type of service and/or the network factors. In these and other implementations, in response to selecting duplication of a data frame, the processing hardware 330 may be configured to select frequency segments for multiple signals configured to carry the duplicated data frame. In some implementations, the baseband circuit 310 may encode of portion of a preamble and/or frame headers of the data frames to indicate the communication technique selected for transmission of the data frames.

For example, the processing hardware 330 may be configured based on a higher reliability requirement, a higher latency requirement, and network factors indicating that the device 300 is operating in three frequency bands each supporting a separate WLAN to select duplication of a data frame. In these and other implementations, the processing hardware 330 may direct the baseband circuit 310 to generate three signals each encoded with the data frame. The three signals may use an entire channel of the WLANs. The processing hardware 330 may direct the RF front-end circuit 320 to shift each of the three signals to the corresponding frequencies of the separate WLANs for transmission.

As another example, the processing hardware 330 may be configured based on a higher reliability requirement, a lower latency requirement, and network factors indicating that the device 300 is operating in one frequency band to select duplication of a data frame. In these and other implementations, the processing hardware 330 may direct the baseband circuit 310 to generate two signals each encoded with the data frame. The processing hardware 330 may direct the RF front-end circuit 320 to shift the two signals to the frequency segments within the one frequency band for transmission.

As another example, the processing hardware 330 may be configured based on a high reliability requirement, a low latency requirement, and network factors indicating that the device 300 is operating in two frequency bands to select duplication of a data frame. In these and other implementations, the processing hardware 330 may direct the baseband circuit 310 to generate two signals each encoded with the data frame. The two signals may each cover a portion of a different channel and other portions of the channels may be allocated to other devices for transmission. The processing hardware 330 may direct the RF front-end circuit 320 to shift each of the two signals to the frequency segments within the corresponding frequency band for transmission.

In some implementations, the processing hardware 330 may be configured to select a duplication of a data frame and frame coding for the data frames provided to the baseband circuit 310 based on the type of service and/or the network factors. For example, the processing hardware 330 may be configured based on a higher reliability requirement, a lower latency requirement, and network factors indicating that the device 300 is operating in three frequency bands, each supporting separate WLANs, to select duplication of a data frame and frame coding. In these and other implementations, the processing hardware 330 may obtain first and second data frames. The processing hardware 330 may code the first and second data frames together to generate a third data frame and direct the baseband circuit 310 to generate three signals. A first signal may be encoded with the first data frame. A second signal may be encoded with the second data frame. A third signal may be encoded with the third data frame. The processing hardware 330 may direct the RF front-end circuit 320 to shift each of the three signals to the corresponding frequencies of the separate WLANs for transmission.

In some implementations, the processing hardware 330 may be configured based on a lower reliability requirement, a middle latency requirement, and network factors indicating that the device 300 is operating in two frequency bands each supporting separate WLAN to select the frequency band with a higher bandwidth and lower loss of data frames and not to select duplication of frames and/or frame coding. In these and other implementations, the processing hardware 330 may direct the baseband circuit 310 to generate a signal encoded with the data frame. The processing hardware 330 may direct the RF front-end circuit 320 to shift the signal to a frequency segment within the selected frequency band for transmission.

In some implementations, the processing hardware 330 may be further configured to process data frames received by the processing hardware 330 from the baseband circuit 310. The processing hardware 330 may process the data frames based on the communication technique used to transmit the data frames.

For example, the processing hardware 330 may analyze the data frames when the data frames are obtained from the baseband circuit 310 to determine where the data frames are duplicate data frames and an integrity of the data frames. For example, the processing hardware 330 may analyze the preamble and/or frame headers to extract information indicating the data frames are duplicates. Alternately or additionally, the processing hardware 330 may analyze characteristics of the data frames to determine the data frames are duplicates. For example, the processing hardware 330 may compare one or more characteristics of the data frames to determine the data frames are duplicates. The processing hardware 330 may also be configured to determine along with the baseband circuit 310 an integrity of the data frames. In these and other implementations, the processing hardware 330 may discard one or more of the data frames based on the analysis. Alternately or additionally, the processing hardware 330 may provide one or more of the data frames as received data frames to other processes of the device 300 based on the analysis.

As another example, the processing hardware 330 may analyze the data frames when the data frames are obtained from the baseband circuit 310 to determine an integrity of the data frames and whether a data frame is a coded data frame. For example, the processing hardware 330 may analyze the preamble and/or frame headers to extract information indicating the data frame is a coded data frame. The processing hardware 330 may also be configured to determine along with the baseband circuit 310 an integrity of the data frames. In these and other implementations, the processing hardware 330 may decode the code data frame to generate multiple decoded data frames. The processing hardware 330 may compare the decoded data frames to other received data frames. In response to the comparison and the integrity of the received data frames, the processing hardware 330 may discard one or more of the data frames based on the analysis. Alternately or additionally, the processing hardware 330 may provide one or more the data frames as received data frames to other processes of the device 300 based on the analysis.

In some implementations, the processing hardware 330 may be part of a datalink layer of network layers of the device 300. For example, the processing hardware 330 may operate as part of a media access control (MAC) layer. In some implementations, the baseband circuit 310 may be part of the MAC layer as well. In these and other implementations, other network layers of the device 300 may not be aware of the communication techniques selected and implemented by the processing hardware 330. In these and other implementations, the processing hardware 330 may provide the received data frames to the other network layers of the device 300. The discarded frames may not be known by the other network layers of the device 300.

Figure 7:
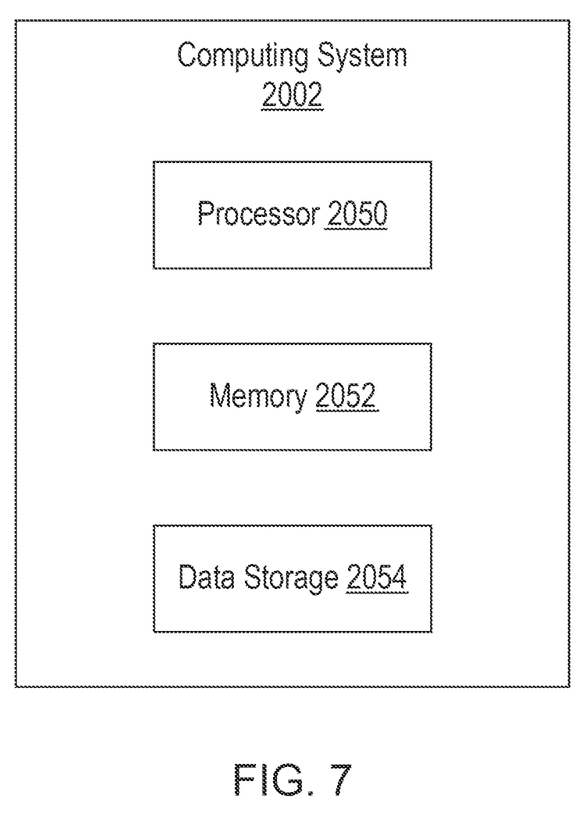
FIG. 7 illustrates a block diagram of an example computing system that may be used to perform or direct performance of one or more operations described according to at least one implementation of the present disclosure.

An example of the processing hardware 330 may include one or more of the processor 2050, memory 2052, and data storage 2054 of FIG. 7. Alternately or additionally, the processing hardware 330 may not include the memory 2052 and the data storage 2054. Modifications, additions, or omissions may be made to the device 300 without departing from the scope of the present disclosure.

Figure 4:
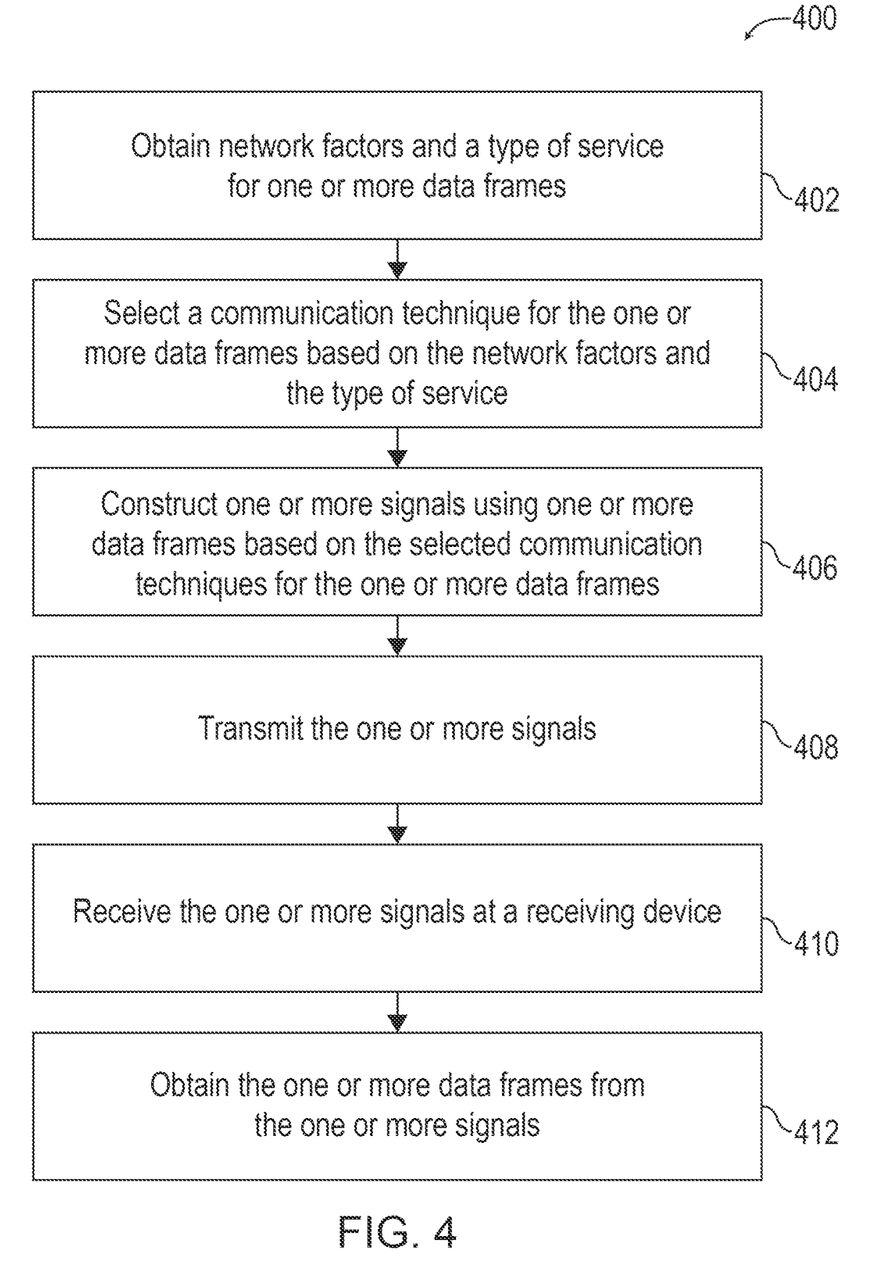
FIG. 4 illustrates a flowchart of an example method of wireless communication.

FIG. 4 illustrates a flowchart of an example method 400 of wireless data transmission, in accordance with one or more implementations of the present disclosure. The method 400 may be implemented, in whole or in part, by one or more of the devices of FIG. 1 or 3.

At block 402, network factors and a type of service for one or more data frames may be obtained. For example, hardware of a datalink layer of a device, such as the first device 110 of FIG. 1, may obtain the network factors and the type of service.

At block 404, a communication technique for the one or more data frames may be selected based on the network factors and the type of service. For example, duplication of data frames may be selected for a first data frame based on the higher reliability requested for the first data frame.

At block 406, one or more signals may be constructed using one or more data frames based on the selected communication techniques for the one or more data frames. For example, a first signal may be encoded with the first data frame using a first frequency segment and a second signal may be encoded with the first data frame using a second frequency segment. The first and second frequency segments may be part of different frequency bands supporting different WLANs. Alternately or additionally, the first and second frequency segments may be part of a single frequency band. In these and other implementations, the first and second frequency segments may be parts of channels of the single frequency band not being used by other devices. The first and second frequency segments may be non-contiguous.

At block 408, the one or more signals may be transmitted. For example, the first signal and the second signal may be transmitted. In some implementations, the first signal and the second signal may be transmitted such that at least a portion of the first signal and a portion of the second signal are simultaneously wirelessly transmitted.

At block 410, the one or more signals may be received. For example a receiving device may receive the first signal and the second signal.

At block 412, the one or more data frames may be obtained from the one or more signals. The first signal may be decoded to obtain a first copy of the first frame and the second signal may be decoded to obtain a second copy of the first frame. The receiving device may analyze the first copy of the first frame and the second copy of the first frame. Based on the analysis, the second device may determine if the first copy of the first frame and second copy of the first frame are the same frame and an integrity of each of the copies. Based on the analysis, the second device may discard one or both of the copies. Alternately or additionally, based on the analysis, the second device may provide one of the copies to other processes of the second device.

One skilled in the art will appreciate that, for this and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations.

Figure 5:
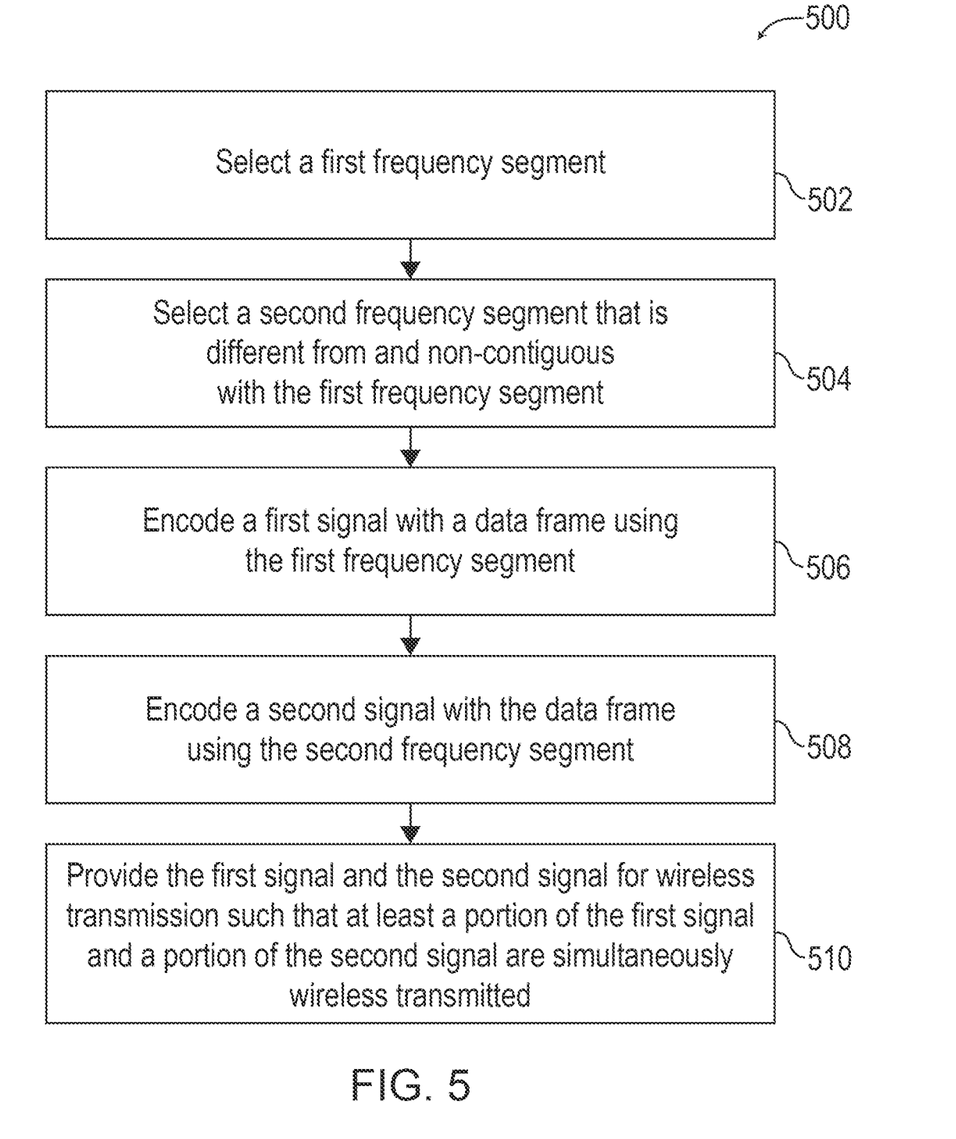
FIG. 5 illustrates a flowchart of another example method of wireless communication.

FIG. 5 illustrates a flowchart of an example method 500 of wireless data transmission, in accordance with one or more implementations of the present disclosure. The method 500 may be implemented, in whole or in part, by one or more of the devices of FIG. 1 or 3.

At block 502, a first frequency segment may be selected. At block 504, a second frequency segment that is different from and non-contiguous with the first frequency segment may be selected. In some implementations, the first frequency segment may be included in a first frequency band configured to support a first wireless network and the second frequency segment may be included in the first frequency band. Alternately or additionally, the first frequency segment may be included in a first frequency band configured to support a first wireless network and the second frequency segment may be included in a second frequency band configured to support a second wireless network. In these and other implementations, the first frequency band and the second frequency band may be defined under the 802.11 protocol and each of the first frequency band and the second frequency band may be one of: a 2.4 GHz band, a 5 GHz band, and a 6 GHz band.

At block 506, a first signal may be encoded with a data frame using the first frequency segment. At block 508, a second signal may be encoded with the data frame using the second frequency segment. In some implementations, a preamble and/or frame headers of the first signal and a preamble and/or frame headers of the second signal may indicate that the first signal and the second signal include the same data frame.

At block 510, the first signal and the second signal may be provided for wireless transmission such that at least a portion of the first signal and a portion of the second signal are simultaneously wirelessly transmitted.

In some implementations, the method 500 may further include selecting a size of the first frequency segment and a size of the second frequency segment based on a size of the data frame.

Alternately or additionally, the method 500 may further include obtaining a second data frame for wireless transmission and obtaining one or more network factors of one or more wireless networks used for wireless transmission of the first signal and the second signal. In these and other implementations, the method 500 may also include in response to the one or more network factors: selecting a third frequency segment, encoding a third signal with the second data frame using the third frequency segment, and providing the third signal for wireless transmission. In these and other implementations, the third signal may be the only signal wireless transmitted that is encoded with the second data frame.

Figure 6:
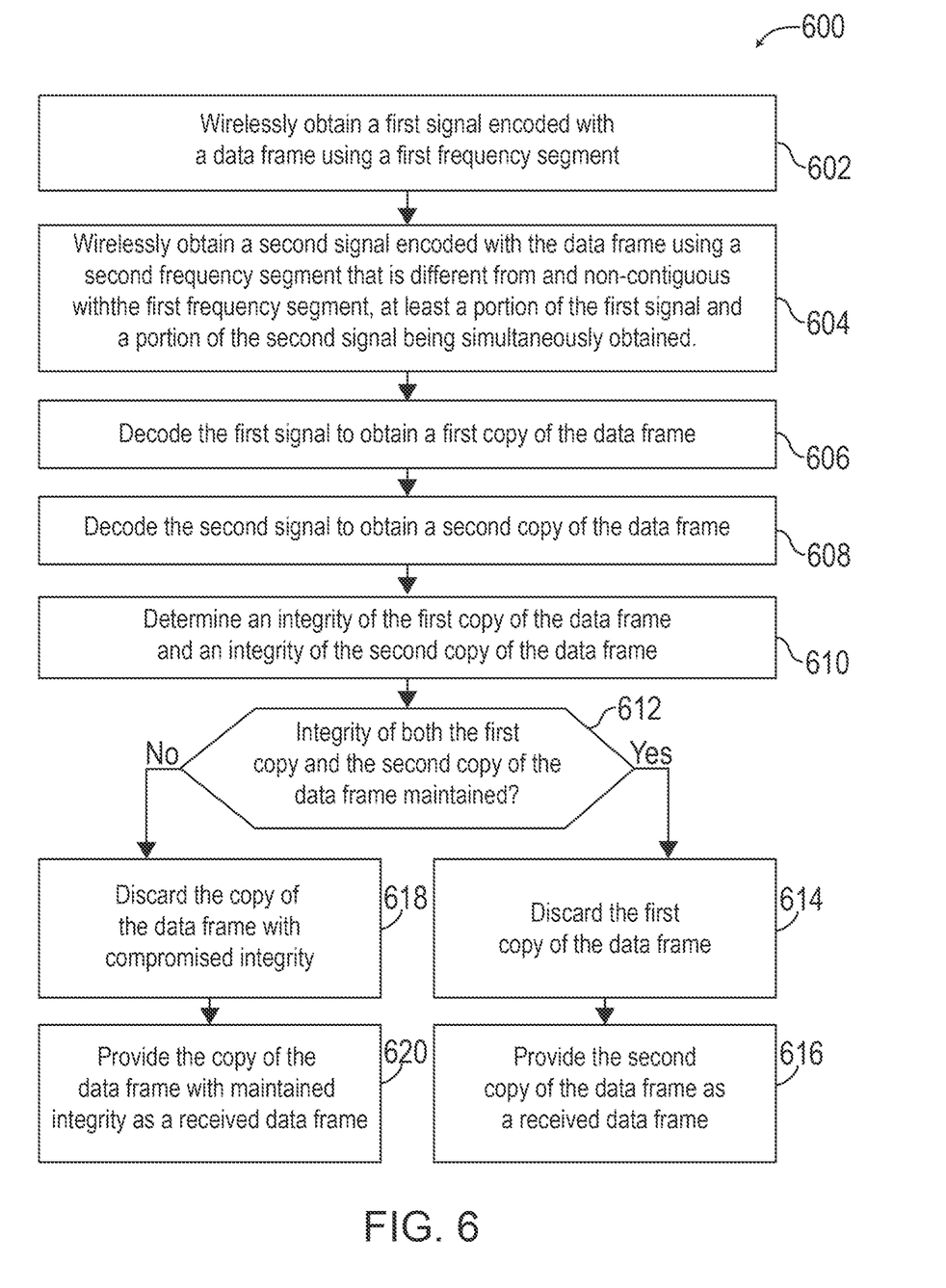
FIG. 6 illustrates a flowchart of another example method of wireless communication.

FIG. 6 illustrates a flowchart of an example method 600 of wireless data transmission, in accordance with one or more implementations of the present disclosure. The method 600 may be implemented, in whole or in part, by one or more of the devices of FIG. 1 or 3.

At block 602, a first signal encoded with a data frame may be wirelessly obtained using a first frequency segment. At block 604, a second signal encoded with the data frame may be wirelessly obtained using a second frequency segment that is different from and non-contiguous with the first frequency segment. In some implementations, at least a portion of the first signal and a portion of the second signal may be simultaneously obtained.

In some implementations, the first frequency segment may be included in a first frequency band configured to support a first wireless network and the second frequency segment may be included in a second frequency band configured to support a second wireless network. Alternately or additionally, the first frequency segment may be included in a first frequency band configured to support a first wireless network and the second frequency segment may be included in the first frequency band.

At block 606, the first signal may be decoded to obtain a first copy of the data frame. At block 608, the second signal may be decoded to obtain a second copy of the data frame. At block 610, an integrity of the first copy of the data frame and an integrity of the second copy of the data frame may be determined.

At block 612, it may be determined if the integrity of both the first copy and the second copy of the data frame is maintained. In response to the integrity of both the first copy and the second copy of the data frame being maintained, the method 600 may proceed to block 614. In response to the integrity of both the first copy and the second copy of the data frame not being maintained, the method 600 may proceed to block 618.

At block 614, the first copy of the data frame may be discarded. At block 616, the second copy of the data frame may be provided as a received data frame.

At block 618, a copy of the data frame with compromised integrity may be discarded. At block 620, a copy of the data frame with maintained integrity may be provided as a received data frame.

In some implementations, the method 600 may further include comparing one or more characteristics of the first copy of the data frame and one or more characteristics of the second copy of the data frame. In these and other implementations, the first copy of the data frame may be discarded and the second copy of the data frame may be provided as the received data frame in response to both the integrity of the first copy of the data frame and the integrity of the second copy of the data frame being maintained and the one or more characteristics of the first copy of the data frame and the one or more characteristics of the second copy of the data frame being the same.

In some implementations, the method 600 may further include obtaining a first copy of the second data frame using the first frequency segment, obtaining a second copy of the second data frame using the second frequency segment, and in response to the integrity of the first copy of the second data frame being maintained and the integrity of the second copy of the second data frame not being maintained: discarding the second copy of the second data frame and providing the first copy of the second data frame as a received second data frame.

The subject technology of the present disclosure is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1 may include a method of wireless communication that include selecting a first frequency segment and selecting a second frequency segment that is different from and non-contiguous with the first frequency segment. The method may also include encoding a first signal with a data frame using the first frequency segment and encoding a second signal with the data frame using the second frequency segment. The method may further include providing the first signal and the second signal for wireless transmission such that at least a portion of the first signal and a portion of the second signal are simultaneously wirelessly transmitted.

Example 2 may include a device that includes processing hardware configured to select a first frequency segment and to select a second frequency segment that is different from and non-contiguous with the first frequency segment. The device may also include baseband circuitry coupled to the processing hardware and configured to encode a first signal with a data frame using the first frequency segment and to encode a second signal with the data frame using the second frequency segment. The device may further include front-end circuitry coupled to the baseband circuitry and configured to shift the first signal to a first frequency segment and to shift the second signal to a second frequency segment for wireless transmission over one or more antennas such that at least a portion of the first signal and a portion of the second signal are simultaneously wirelessly transmitted.

Example 3 may include a method of wireless communication that may include wirelessly obtaining a first signal encoded with a data frame using a first frequency segment and wirelessly obtaining a second signal encoded with the data frame using a second frequency segment that is different from and non-contiguous with the first frequency segment. At least a portion of the first signal and a portion of the second signal may be simultaneously obtained. The method may also include decoding the first signal to obtain a first copy of the data frame, decoding the second signal to obtain a second copy of the data frame, and determining an integrity of the first copy of the data frame and an integrity of the second copy of the data frame. The method may further include in response to the integrity of the first copy of the data frame and the integrity of the second copy of the data frame being maintained, discarding the first copy of the data frame and providing the second copy of the data frame as a received data frame.

FIG. 7 illustrates a block diagram of an example computing system 2002 that may be used to perform or direct performance of one or more operations described according to at least one implementation of the present disclosure. The computing system 2002 may include a processor 2050, a memory 2052, and a data storage 2054. The processor 2050, the memory 2052, and the data storage 2054 may be communicatively coupled.

In general, the processor 2050 may include any suitable special-purpose or general-purpose computer, computing entity, or processing device including various computer hardware or software modules and may be configured to execute instructions stored on any applicable computer-readable storage media. For example, the processor 2050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 2050 may include any number of processors configured to, individually or collectively, perform or direct performance of any number of operations described in the present disclosure.

In some implementations, the processor 2050 may be configured to interpret and/or execute computer-executable instructions and/or process data stored in the memory 2052, the data storage 2054, or the memory 2052 and the data storage 2054. In some implementations, the processor 2050 may fetch computer-executable instructions from the data storage 2054 and load the computer-executable instructions in the memory 2052. After the computer-executable instructions are loaded into memory 2052, the processor 2050 may execute the computer-executable instructions.

The memory 2052 and the data storage 2054 may include computer-readable storage media for carrying or having computer-executable instructions or data structures stored thereon. Such computer-readable storage media may include any available media that may be accessed by a general-purpose or special-purpose computer, such as the processor 2050. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2050 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSP's, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present disclosure.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of wireless communication, the method comprising:
    selecting a first frequency segment using link state information received outside of a time when link state information is typically collected;
    selecting, using the link state information, a second frequency segment that is different from and non-contiguous with the first frequency segment, wherein at least one of the first frequency segment and the second frequency segment are selected based on a reliability level and a latency level;
    coding a first data frame and a second data frame together to generate a third data frame;
    encoding a first signal with the third data frame using the first frequency segment;
    encoding a second signal with the third data frame using the second frequency segment, wherein a preamble or frame header of the first signal and a preamble or frame header of the second signal both include a data field that includes information that indicates that the first signal and the second signal include the same data frame; and
    providing the first signal and the second signal for wireless transmission such that at least a portion of the first signal and a portion of the second signal are simultaneously wirelessly transmitted over different links.

2. The method of claim 1, wherein the first frequency segment is included in a first frequency band configured to support a first wireless network and the second frequency segment is included in the first frequency band.

3. The method of claim 1, wherein the first frequency segment is included in a first frequency band configured to support a first wireless network and the second frequency segment is included in a second frequency band configured to support a second wireless network.

4. The method of claim 3, wherein the first frequency band and the second frequency band are defined under the 802.11 protocol and each of the first frequency band and the second frequency band are one of: a 2.4 GHz band, a 5 GHz band, and a 6 GHz band.

5. The method of claim 1, further comprising selecting a size of the first frequency segment and a size of the second frequency segment based on a size of the third data frame.

6. The method of claim 1, further comprising selecting first frequencies for the first frequency segment and second frequencies for the second frequency segment based on one or more network factors of one or more wireless networks used for wireless transmission of the first signal and the second signal.

7. The method of claim 1, further comprising:
obtaining a fourth data frame for wireless transmission;
obtaining one or more network factors of one or more wireless networks used for wireless transmission of the first signal and the second signal; and
in response to the one or more network factors:
selecting a third frequency segment;
encoding a third signal with the fourth data frame using the third frequency segment; and
providing the third signal for wireless transmission.

8. The method of claim 1, wherein the link state information comprises channel quality indicator (CQI) information.

9. The method of claim 1, further comprising selecting the first frequency segment and the second frequency segment based on a service type comprising one or more of a latency level for the third data frame.

10. The method of claim 1, wherein the first data frame is a duplication of the second data frame.

11. A device, comprising:
processing hardware configured to:
select, using link state information, a first frequency segment and select, using the link state information, a second frequency segment that is different from and non-contiguous with the first frequency segment, wherein at least one of the first frequency segment and the second frequency segment are selected based on a reliability level, the link state information having been collected outside of a time when link state information is typically collected; and
code a first data frame and a second data frame together to generate a third data frame;
baseband circuitry coupled to the processing hardware and configured to encode a first signal with the third data frame and to encode a second signal with the third data frame, wherein a preamble or frame header of the first signal and a preamble or frame header of the second signal both include a data field that includes information that indicates that the first signal and the second signal include the same data frame; and
front-end circuitry coupled to the baseband circuitry and configured to shift the first signal to a first frequency segment and to shift the second signal to a second frequency segment for wireless transmission over one or more antennas such that at least a portion of the first signal and a portion of the second signal are simultaneously wirelessly transmitted over different links.

12. The device of claim 11, wherein the first frequency segment is included in a first frequency band configured to support a first wireless network and the second frequency segment is included in a second frequency band configured to support a second wireless network.

13. The device of claim 11, wherein the first frequency segment is included in a first frequency band configured to support a first wireless network and the second frequency segment is included in the first frequency band.

14. The device of claim 11, wherein the processing hardware is further configured to select a size of the first frequency segment and a size of the second frequency segment based on a size of the third data frame.

15. The device of claim 11, wherein the processing hardware is further configured select first frequencies for the first frequency segment and second frequencies for the second frequency segment based on one or more network factors of one or more wireless networks used for wireless transmission of the first signal and the second signal.

16. The device of claim 11, wherein the processing hardware is further configured to:
obtain one or more network factors of one or more wireless networks used for wireless transmission of the first signal and the second signal; and
in response to the one or more network factors, direct the baseband circuitry to encode the first signal with the third data frame and to encode the second signal with the third data frame.

17. A method of wireless communication, the method comprising:
selecting, using link state information that was received outside of a time when link state information is typically collected, a first frequency segment included in a first frequency band configured to support a first wireless network;
selecting, using link state information, a second frequency segment included in a second frequency band configured to support a second wireless network, wherein at least one of the first frequency segment and the second frequency segment are selected based on a reliability level;
coding a first data frame and a second data frame together to generate a third data frame;
encoding a first signal with the third data frame using the first frequency segment;
encoding a second signal with the third data frame using the second frequency segment, wherein a preamble or frame header of the first signal and a preamble or frame header of the second signal both include a data field that includes information that indicates that the first signal and the second signal include the same data frame; and
providing the first signal and the second signal for wireless transmission such that at least a portion of the first signal and a portion of the second signal are simultaneously wirelessly transmitted over different links.

18. The method of claim 17, wherein the first frequency band and the second frequency band are defined under the 802.11 protocol and each of the first frequency band and the second frequency band are one of: a 2.4 GHz band, a 5 GHz band, and a 6 GHz band.

19. The method of claim 17, further comprising selecting a size of the first frequency segment and a size of the second frequency segment based on a size of the third data frame.

20. The method of claim 17, further comprising:
obtaining a fourth data frame for wireless transmission;
obtaining one or more network factors of one or more of the first wireless network and the second wireless network; and
in response to the one or more network factors:
selecting a third frequency segment;
encoding a third signal with the fourth data frame using the third frequency segment; and
providing the third signal for wireless transmission.

\* \* \* \* \*